United States Patent
Asahara

(10) Patent No.: US 9,069,502 B2
(45) Date of Patent: Jun. 30, 2015

(54) SYSTEM AND METHOD FOR CONTROLLING THE SETTINGS OF AN IMAGING FORMING APPARATUS

(71) Applicant: CANON KABUSHIKI KAISHA, Tokyo (JP)

(72) Inventor: Hideo Asahara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/944,701

(22) Filed: Jul. 17, 2013

(65) Prior Publication Data

US 2014/0022591 A1    Jan. 23, 2014

(30) Foreign Application Priority Data

Jul. 20, 2012    (JP) ................................. 2012-161545

(51) Int. Cl.
- *G06F 3/12* (2006.01)
- *G06K 15/00* (2006.01)
- *G06K 15/02* (2006.01)

(52) U.S. Cl.
CPC ............ *G06F 3/1236* (2013.01); *G06F 3/1293* (2013.01); *G06F 3/1204* (2013.01); *G06F 3/123* (2013.01); *G06F 3/1284* (2013.01); *G06K 15/002* (2013.01); *G06K 15/402* (2013.01); *G06K 15/408* (2013.01); *G06K 15/1803* (2013.01)

(58) Field of Classification Search
CPC .............. H04N 2201/3202; H04N 2201/3225; H04W 76/04
USPC .................................. 358/1.15; 370/252, 329
See application file for complete search history.

(56) References Cited

U.S. PATENT DOCUMENTS

| | | | | |
|---|---|---|---|---|
| 2009/0244599 | A1* | 10/2009 | Tanaka | 358/1.15 |
| 2010/0058359 | A1* | 3/2010 | Ferlitsch | 719/321 |
| 2012/0084767 | A1* | 4/2012 | Ishimoto | 717/173 |

FOREIGN PATENT DOCUMENTS

JP    2009-230600 A    10/2009

* cited by examiner

*Primary Examiner* — Jacky X Zheng

(74) *Attorney, Agent, or Firm* — Canon USA Inc. IP Division

(57) ABSTRACT

An image forming apparatus determines whether an import data receiving path is affected by import processing, imports import data when it is determined that the import data receiving path is not affected, outputs an import result log via the import data receiving path, and displays, when it is determined that the import data receiving path is affected, a warning screen indicating that the import data receiving path is affected by the import before the import data is imported.

13 Claims, 12 Drawing Sheets

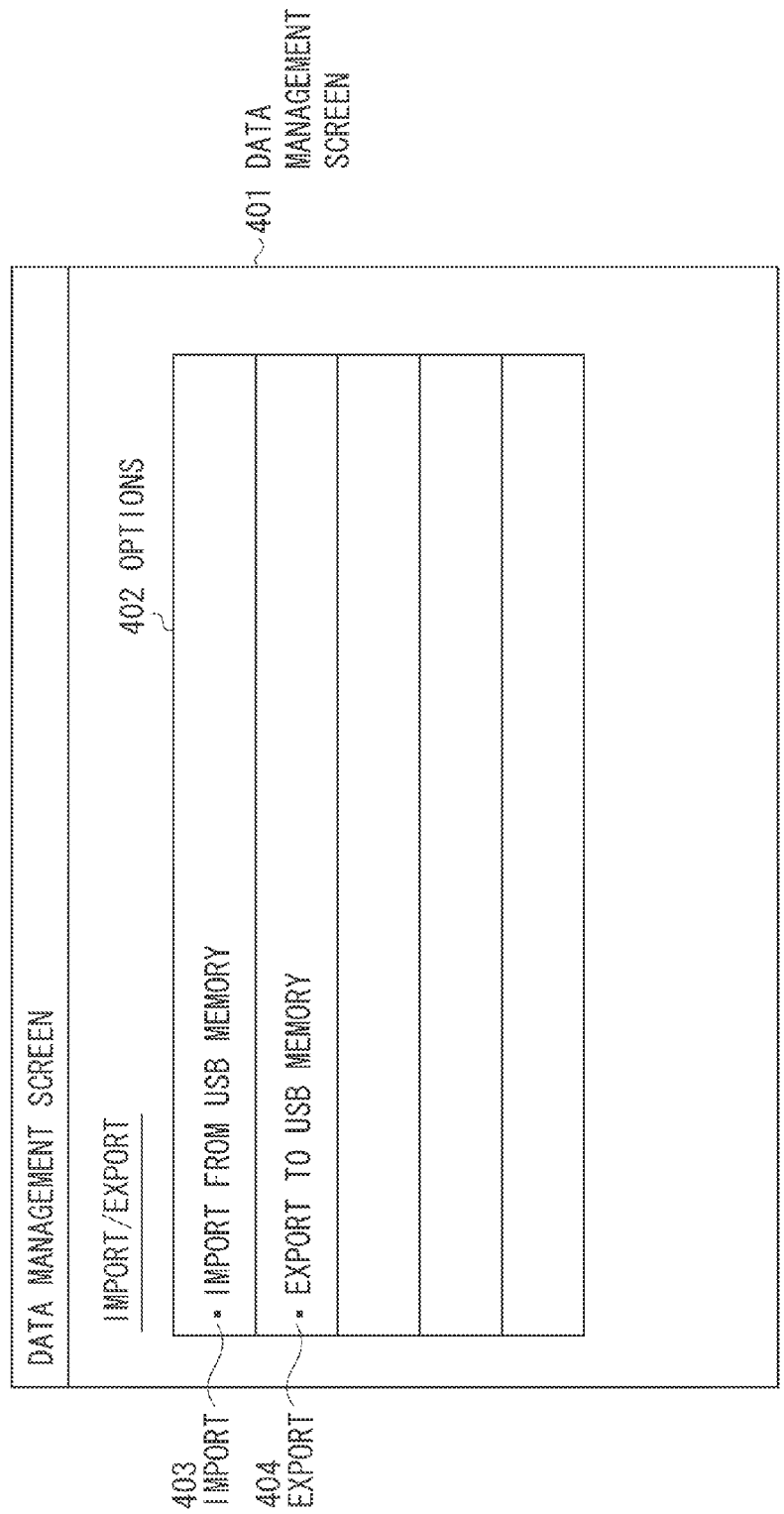

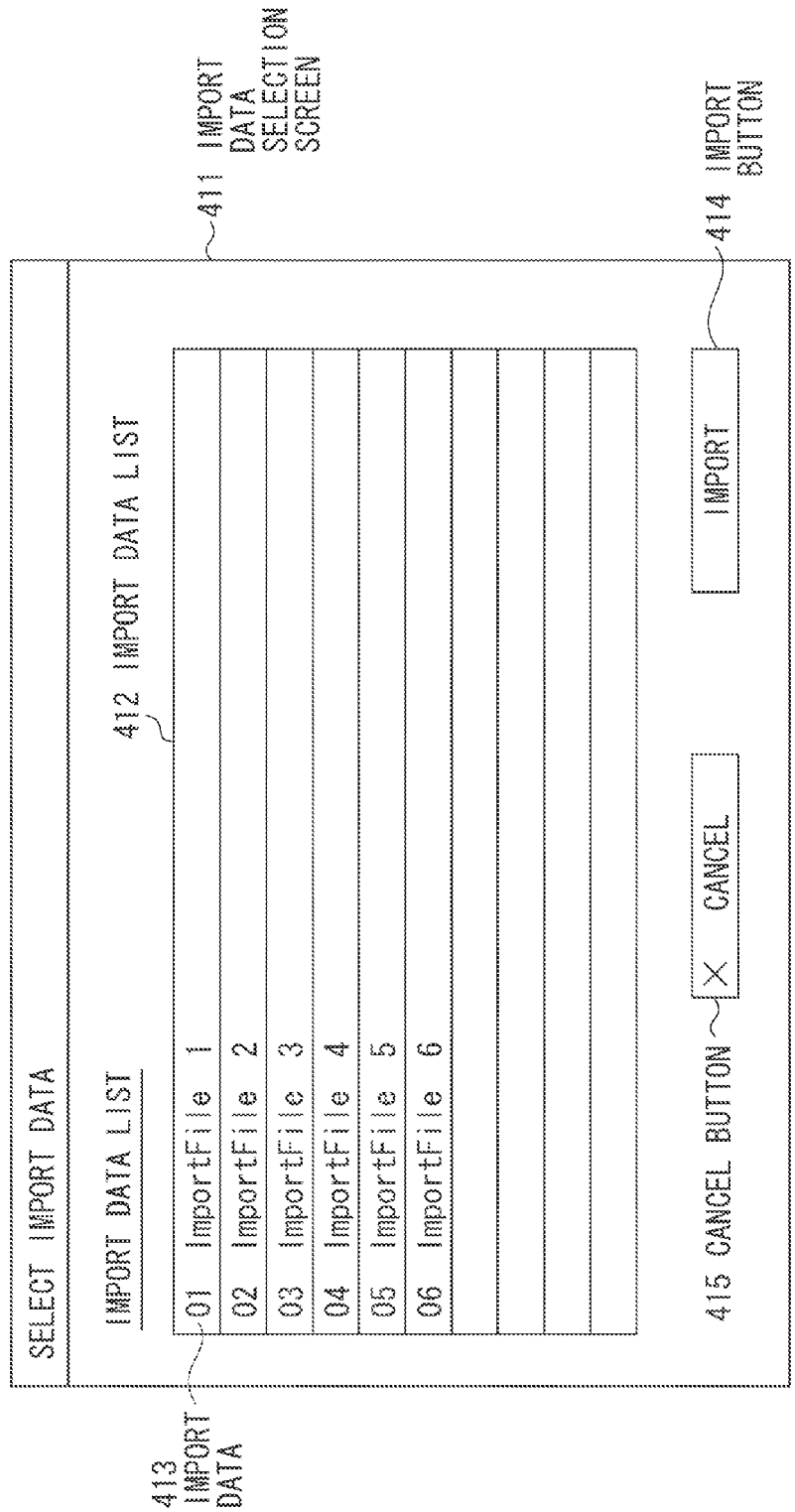

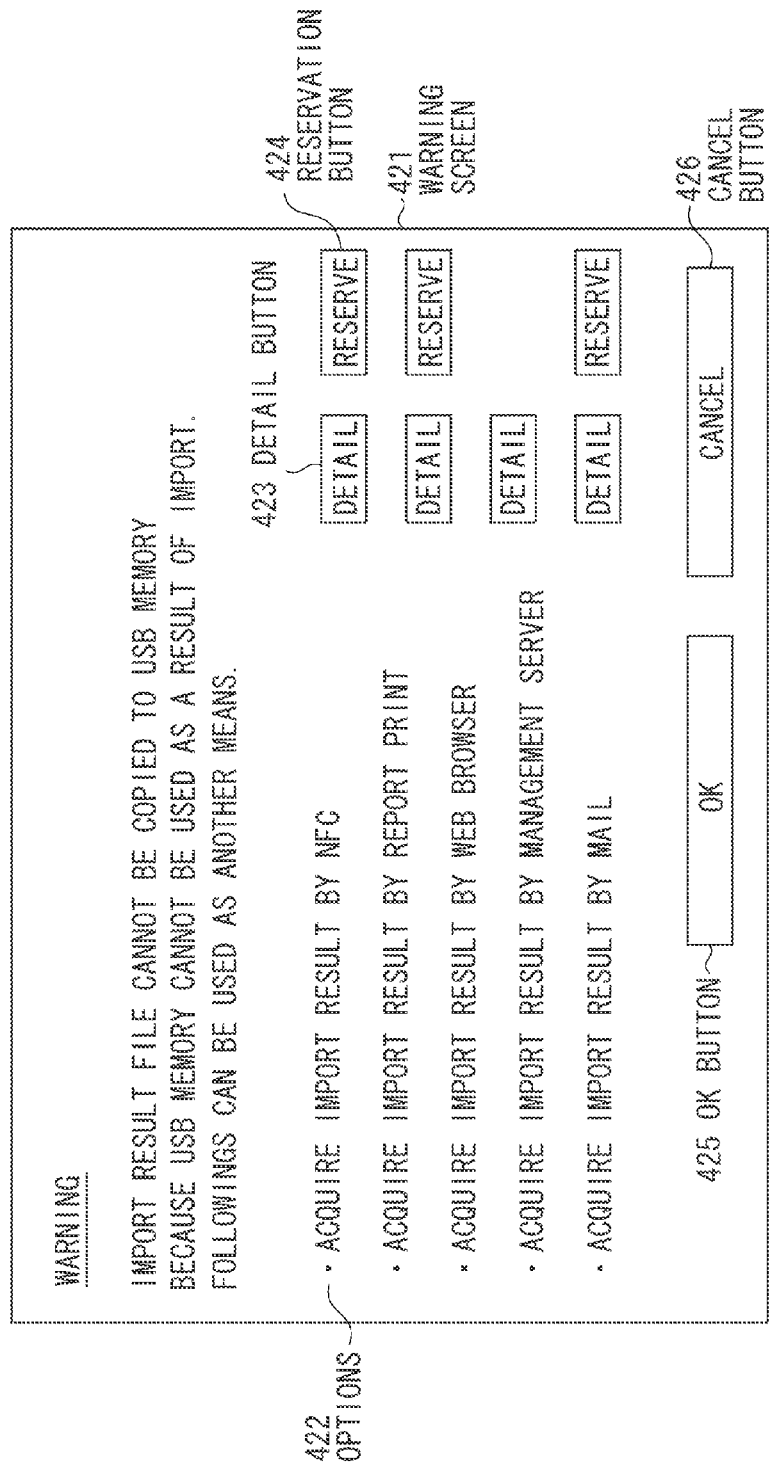

FIG. 5

501 IMPORT DATA

```xml
<?xml version="1.0" encoding="UTF-8" ?>
<device_settings>
    <communication_settings>
        <usb_host> true </usb_host>  502
        <usb_mass_storage> false </usb_mass_storage>
        <nfc_rw> true </nfc_rw>
        <nfc_tag> true </nfc_tag>
    </communication_settings>
    <network_settings>
        <ipv4> true </ipv4>
        <ip_address> 192.168.0.1 </ip_address>
        <gw> 192.168.0.2 </gw>
        <dns> 192.168.0.4 </dns>
        <dhcp> false </dhcp>
        <ipv6> false </ipv6>
    </network_settings>
    <email_settings>
        <smtp_address> 192.168.1.1</smtp_address>
        <user> aaa </user>
        <password> xxx </password>
    </email_settings>
</device_settings>
```

FIG. 6

| IDENTIFIER 1 | IDENTIFIER 2 | IDENTIFIER 3 | DESCRIPTION | VALUE |
|---|---|---|---|---|
| device_settings | communication_settings | usb_host | VALIDITY/INVALIDITY OF USB HOST INTERFACE | true |
| | | usb_mass_storage | VALIDITY/INVALIDITY OF USB MASS STORAGE DEVICE | true |
| | | nfc_rw | VALIDITY/INVALIDITY OF NFC READER/WRITER | true |
| | | nfc_tag | VALIDITY/INVALIDITY OF NFC TAG | true |
| | network_settings | ipv4 | VALIDITY/INVALIDITY OF IPV4 | true |
| | | ip_address | IP ADDRESS | 192.168.0.1 |
| | | gw | Gateway ADDRESS | 192.168.0.2 |
| | | dns | DNS SERVER ADDRESS | 192.168.0.4 |
| | | dhcp | VALIDITY/INVALIDITY OF DHCP | false |
| | | ipv6 | VALIDITY/INVALIDITY OF IPV6 | false |
| | email_settings | smtp_address | SMTP SERVER ADDRESS | 192.168.1.1 |
| | | user | USER NAME DURING ACCESS FROM SMTP SERVER | aaa |
| | | password | PASSWORD DURING ACCESS FROM SMTP SERVER | xxx |

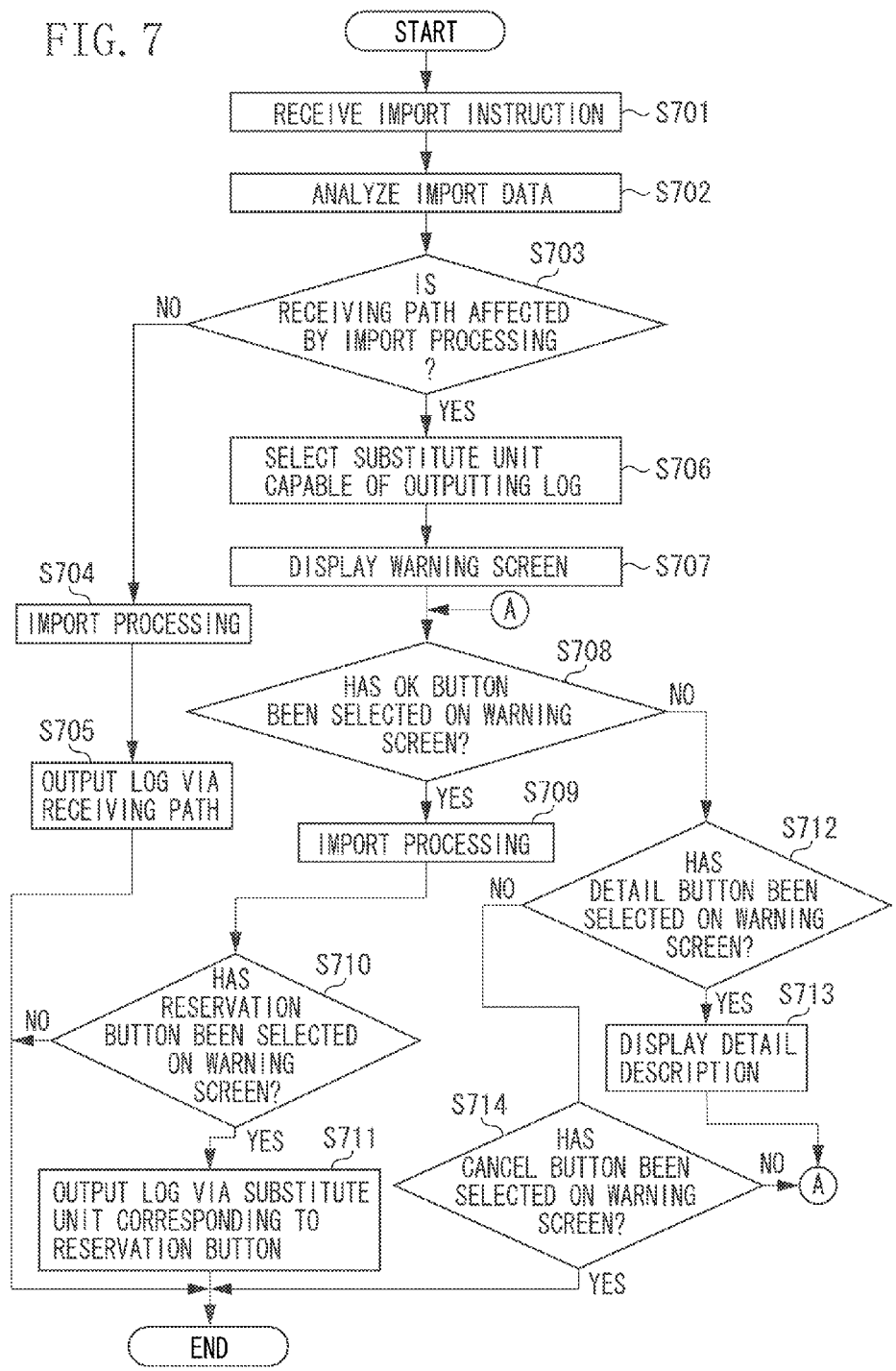

FIG. 8

| 801 PATH | 802 PREREQUISITE |
|---|---|
| PATH | PREREQUISITE |
| USB MEMORY | device_settings.communication_settings.usb_host:true<br>device_settings.communication_settings.usb_mass_storage:true |
| NFC CHIP | device_settings.communication_settings.nfc_tag:true |
| REPORT PRINT | NO |
| WEB BROWSER | device_settings.network_settings.ipv4/ipv6:true |
| MANAGEMENT SERVER | device_settings.network_settings.ipv4/ipv6:true |
| E-MAIL | device_settings.email_settings.smtp_address:10.0.0.0<br>device_settings.network_settings.ipv4/ipv6:true |

803

FIG. 9A    901 IMPORT RESULT SUCCESS LOG

[Device Import Report]
Date:       02/14/2012 22:00-23:00
User:       Administrator
From:       Local(USB) —— 902 PATH
Operation:  Restore
Result:     Success —— 903 RESULT 908
VALIDATION/INVALIDATION OF USB HOST INTERFACE          true > true      ⎫ 904 SETTING ABOUT USB
VALIDATION/INVALIDATION OF USB MASS STORAGE DEVICE     true > false*    ⎭
VALIDATION/INVALIDATION OF NFC READER/WRITER           true > true      ⎫ 905 SETTING ABOUT NFC
VALIDATION/INVALIDATION OF NFC TAG                     true > true      ⎭
VALIDATION/INVALIDATION OF IPV4                        true > true
IP ADDRESS                                             192.168.0.1 > 192.168.0.1
Gateway ADDRESS                                        192.168.0.2 > 192.168.0.2
DNS SERVER ADDRESS                                     192.168.0.4 > 192.168.0.4   906 SETTING ABOUT NETWORK
VALIDATION/INVALIDATION OF DHCP                        false > false
VALIDATION/INVALIDATION OF IPV6                        false > false
SMTP SERVER ADDRESS                                    192.168.1.1 > 192.168.1.1
USER NAME DURING ACCESS FROM SMTP SERVER               aaa > aaa                   907 SETTING ABOUT E-MAIL
PASSWORD DURING ACCESS FROM SMTP SERVER                xxx > xxx

909 CHANGE LOG

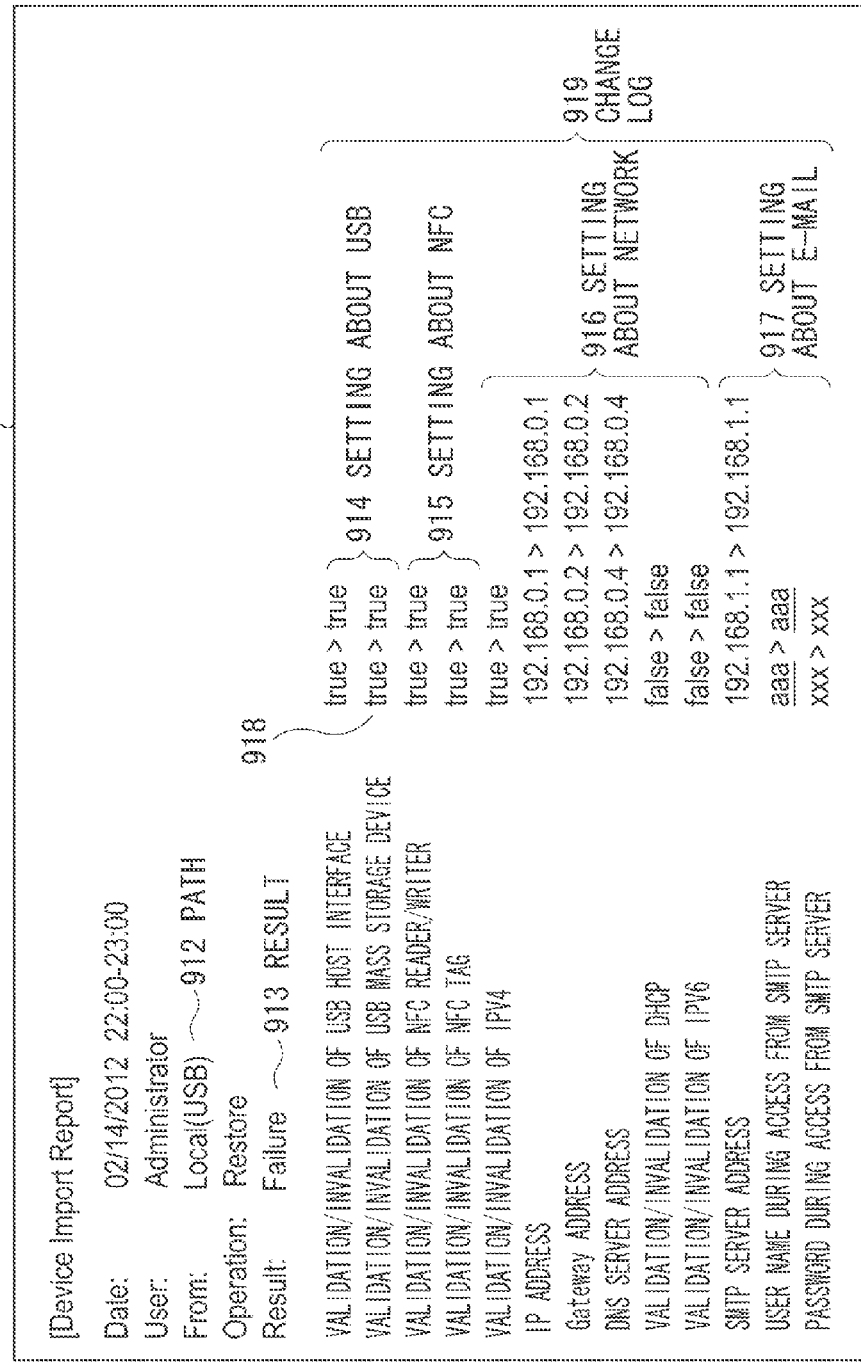

SYSTEM AND METHOD FOR CONTROLLING THE SETTINGS OF AN IMAGING FORMING APPARATUS

BACKGROUND

1. Field

Aspects of the present invention generally relate to a technique for importing a setting value for an image forming apparatus.

2. Description of the Related Art

An image forming apparatus retains setting values for controlling respective operations of its functions. Further, the image forming apparatus may include an export function for gathering the setting values and extracting the gathered setting values out of the image forming apparatus. Similarly, the image forming apparatus may include an import function for integrally setting the setting values included in extracted export data in the image forming apparatus.

When a network address of the image forming apparatus is changed by the import function, the original network address may become unusable, so that communication is interrupted. Japanese Patent Application Laid-Open No. 2009-230600 discusses a mechanism for retaining and separately using communicable addresses for each communication partner.

The image forming apparatus having an import function may include a function of outputting an import result log and presenting a result of import processing to a user. In such an image forming apparatus, when a network address is changed as a result of the import processing, the import result log cannot be output. Further, the user cannot acquire the import result log.

SUMMARY

According to an aspect of the present invention, an image forming apparatus having a function of importing import data including a setting value for the image forming apparatus includes a memory and a processing unit in communication with the memory, the processing unit being configured to control a receiving unit configured to receive an import instruction to receive the import data and perform import processing via any one of a plurality of paths, an analysis unit configured to analyze the import data based on the import instruction, a determination unit configured to determine, based on an import data receiving path via which the import data has been received and the import data that has been analyzed by the analysis unit, whether the import data receiving path is affected by the import, an output unit configured to output, when the determination unit determines that the import data receiving path is not affected, an import result log representing a result of importing the import data via the import data receiving path after the import data has been imported, and a display unit configured to display, when the determination unit determines that the import data receiving path is affected, a screen displaying a warning that the import data receiving path is affected by the import before the import data is imported.

Accordingly, a user can know that an import result log will not be output before performing the import when a setting value is imported to the image forming apparatus.

Further features and aspects of the present invention will become apparent from the following detail description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 4A, 4B, and 4C respectively illustrate a data management screen, an import data selection screen, and a warning screen displayed by a warning display unit.

FIG. 5 illustrates an example of import data.

FIG. 6 illustrates a table representing an example of setting values retained in the image forming apparatus.

FIG. 7 is a flowchart illustrating details of import processing.

FIG. 8 illustrates a table of a path and a prerequisite.

FIG. 9A illustrates an import result log output when import processing has been successful, and FIG. 9B illustrates an import result log output when import processing has been unsuccessful.

DESCRIPTION OF THE EMBODIMENTS

Figure 1:
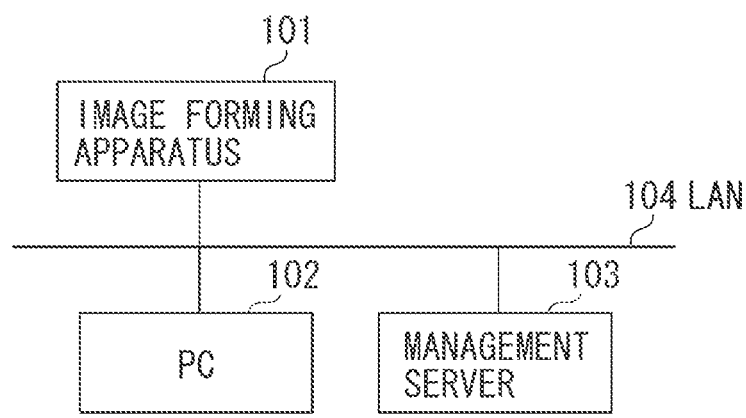
FIG. 1 illustrates a network configuration.

Various exemplary embodiments, features, and aspects of the invention will be described in detail below with reference to the drawings.

A first exemplary embodiment will be described below. A setting value for an image forming apparatus 101 means a parameter of software for switching an operation of the image forming apparatus 101 or an operation instruction. If the setting value is the parameter of the software, the setting value is stored in the image forming apparatus 101, and is referred to, as needed, when corresponding processing is performed. For example, the type of the parameter includes a parameter by which image formation processing is changed when the setting value for the image forming apparatus 101 is switched. The other types of the parameter include a parameter for changing an operation of a user interface in the image forming apparatus 101 and a parameter for validating or invalidating a specific function. If the setting value is the operation instruction, the image forming apparatus 101 performs a designated operation. For example, the type of the operation includes an instruction to adjust hardware in the image forming apparatus 101 or an instruction to perform cleaning.

Export data is data including one or more setting values, which have already been set in the image forming apparatus 101, and is generated by exporting the setting values set in the image forming apparatus 101.

Import data is data including one or more setting values to be set in the image forming apparatus 101. When the import data is imported to the image forming apparatus 101, the setting values are set in the image forming apparatus 101. The import data may be export data itself, which has been exported from the image forming apparatus 101 itself, or may be export data, which has been exported from the other image forming apparatus. The former is a method used when the setting values for the image forming apparatus 101 are backed up and restored. The latter is a method used when the image forming apparatus 101 is replaced. Alternatively, a user can also generate the export data on the PC 102. In this case, the method is used when a large number of image forming apparatuses are collectively introduced.

FIG. 5 illustrates an example of the import data or the export data. In this example, an identifier represented in the form of an extensible markup language (XML) file for identifying a setting value for the image forming apparatus 101 is the name of a tag. An entity of the setting value is described in a value. The type of the setting value included in the import data or the export data includes a setting value about printing such as a sheet size and setting values about a facsimile (FAX) function and communication with other apparatuses.

Importing the setting value for the image forming apparatus 101 means reflecting a setting value for the image forming apparatus 101 included in import data acquired from the outside image forming apparatus 101, in the image forming apparatus 101. The reflection means changing a parameter of software and performing an operation.

Exporting the setting value for the image forming apparatus 101 means outputting some or all of setting values currently set in the image forming apparatus 101 to the outside as export data.

A network configuration in the present exemplary embodiment will be described with reference to FIG. 1.

The image forming apparatus 101 is an apparatus having a function of forming an image. A multi-function peripheral is its representative. The function of the image forming apparatus 101 will be described in detail with reference to FIGS. 2 and 3. The image forming apparatus 101 can communicate via the LAN 104 with another information device connected to a local area network (LAN) 104. While only one image forming apparatus 101 is described in FIG. 1, a plurality of image forming apparatuses 101 may exist.

A personal computer (PC) 102 is a general personal computer. A user can operate the image forming apparatus 101 and a management server 103 using a web browser of the PC 102.

The management server 103 is a server capable of managing at least one image forming apparatus 101.

The PC 102 and the management server 103 are versatile, and are not limitative. Therefore, description of a hardware configuration and a software configuration is omitted.

The LAN 104 is a network capable of performing digital communication. The image forming apparatus 101, the PC 102, and the management server 103 are connected through the LAN 104, to enable communication with each other.

Figure 2:
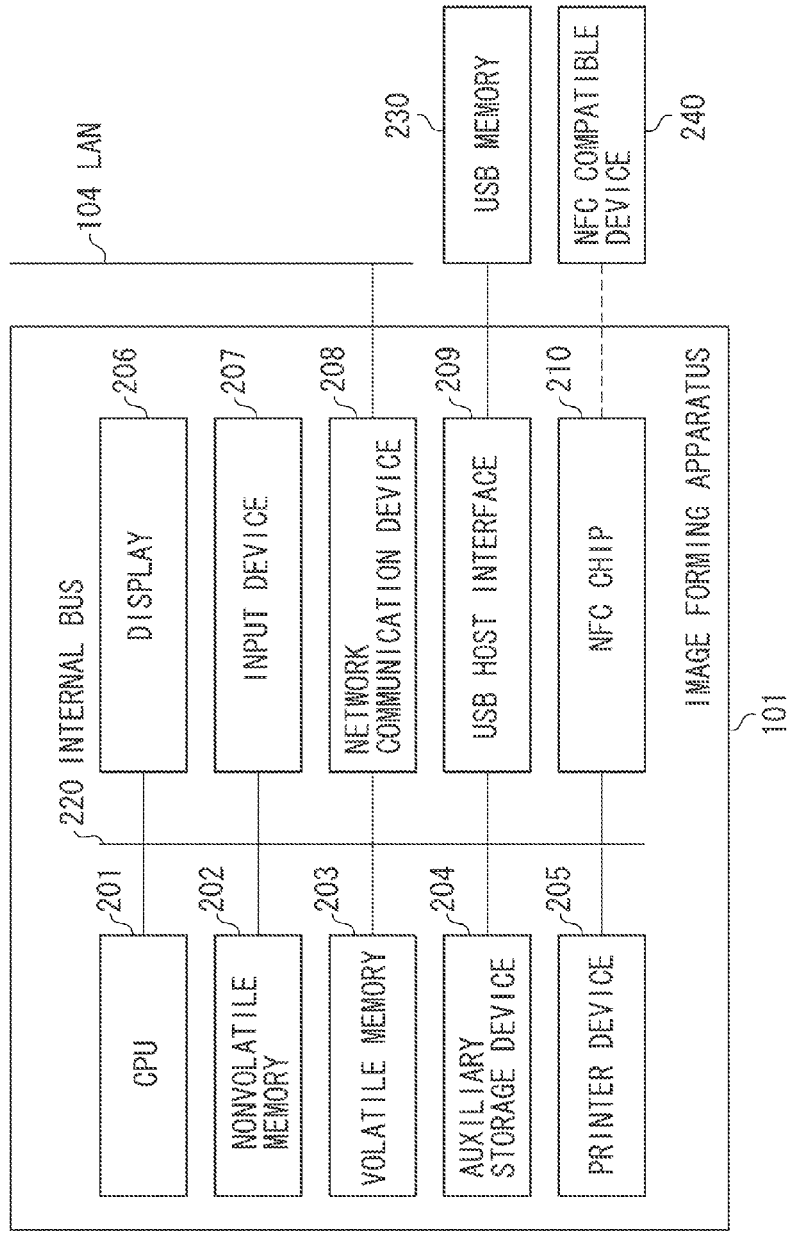
FIG. 2 illustrates a hardware configuration of an image forming apparatus.

A hardware configuration of the image forming apparatus 101 in the present exemplary embodiment will be described with reference to FIG. 2.

A central processing unit (CPU) 201 executes a program and controls various types of processing.

A nonvolatile memory 202 includes a read-only memory (ROM), and stores a program and data required in an initial stage when devices constituting the image forming apparatus 101 are started.

A volatile memory 203 includes a random access memory (RAM), and is used as a temporary storage location of a program and data.

An auxiliary storage device 204 includes a large-capacity storage device such as a hard disk or a RAM drive, and stores large-capacity data, retains an execution code for a program, and retains a setting value for the image forming apparatus 101. The auxiliary storage device 204 stores data which needs to be retained for a long time. The auxiliary storage device 204 is a nonvolatile storage device, and can continue to store data even if power to the image forming apparatus 101 is turned off.

A printer device 205 is a device for printing characters and images based on digital data on paper media.

A display 206 is a device for transmitting information to the user. The user represents users of the image forming apparatus 101, the PC 102, and the management server 103.

An input device 207 is a device for receiving input of characters and data by the user.

A network communication device 208 is a device for communicating with another information processing apparatus via a network. In the present exemplary embodiment, the network communication device 208 can communicate with the PC 102 and the management server 103 via the LAN 104.

A universal serial bus (USB) host interface 209 is an interface for making a USB device connected thereto usable. For example, a USB memory 230 can read and write data when connected to the USB host interface 209.

A near field communication (NFC) chip 210 is an interface conforming to a protocol for NFC technology and capable of exchanging data with an NFC compatible device 240.

An internal bus 220 is a communication bus that connects hardware devices in a communicable state within the image forming apparatus 101.

The USB memory 230 is a nonvolatile data storage, and a device capable of reading and writing data when connected to an information device including the USB host interface 209.

The NFC compatible device 240 is an information device capable of performing communication using the NFC protocol. A smartphone and a tablet PC are its examples.

A software configuration of the image forming apparatus 101 according to the present exemplary embodiment will be described with reference to FIG. 3.

Figure 3:
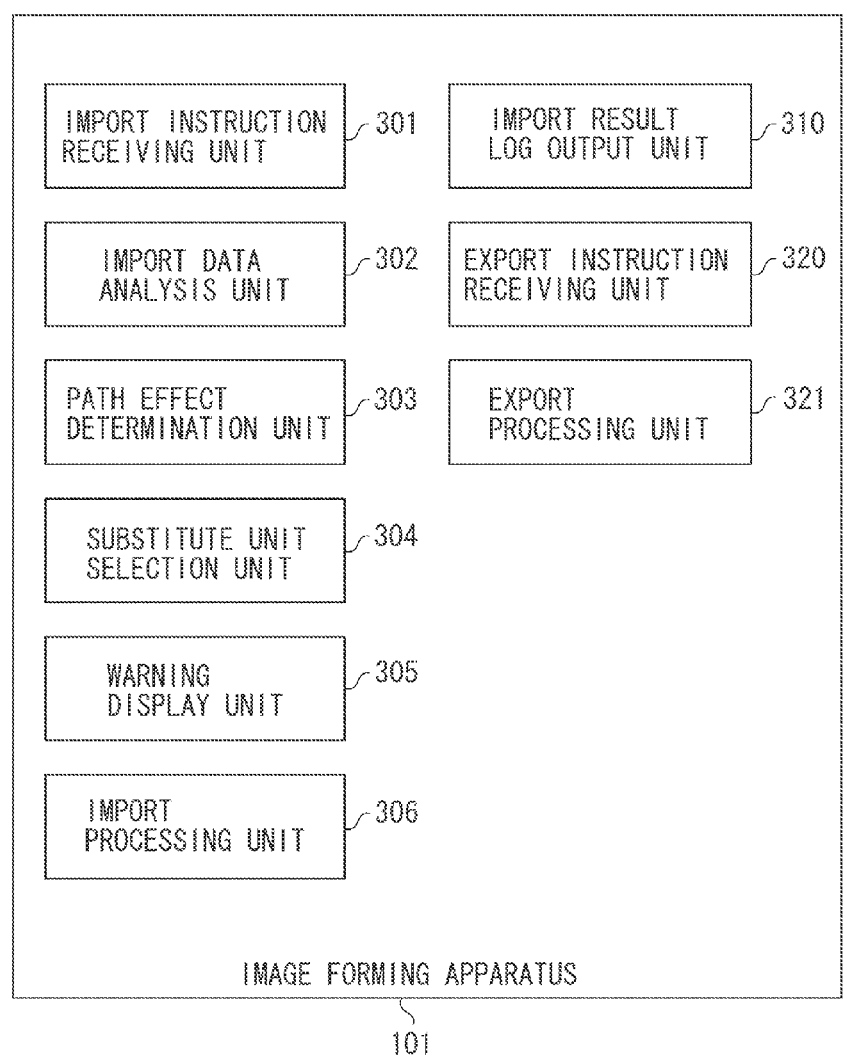
FIG. 3 illustrates a software configuration of the image forming apparatus.

Each of software illustrated in FIG. 3 is stored in the nonvolatile memory 202 or the auxiliary storage device 204 in the image forming apparatus 101, and the CPU 201 executes the software. Various types of information used during execution of the software are retained in the volatile memory 203 or the auxiliary storage device 204 within the image forming apparatus 101. Various types of information are exchanged between the pieces of software. The network communication device 208 is used in the image forming apparatus 101 to communicate with each of the information devices on the network.

The function of each of the pieces of software will be described below.

An import instruction receiving unit 301 is a unit for receiving an instruction from a user who imports a setting value for the image forming apparatus 101 using various interfaces included in the image forming apparatus 101.

A path via which the setting value is imported includes four paths.

The first path is a path via which an import instruction is issued to the image forming apparatus 101 through the web browser via the LAN 104 from the PC 102.

The second path is a path via which an import instruction is issued to the image forming apparatus 101 via the LAN 104 from the management server 103.

The third path is a path via which an import instruction is issued to the image forming apparatus 101 through the USB memory 203 via the USB host interface 209.

The fourth path is a path via which an import instruction is issued to the image forming apparatus 101 through the NFC chip 210 via the NFC compatible device 240.

The import instruction receiving unit 301 receives an instruction to receive and import import data (an import instruction) from the user via the plurality of paths. For example, an operation performed by the user when the import instruction is issued to the image forming apparatus 101 through the USB memory 230 will be described with reference to FIG. 4. First, the user opens a data management screen 401 illustrated in FIG. 4A on the display 206 in the image forming apparatus 101. Options 402 are displayed on the data management screen 401. An import 403 and an export 404 are displayed in the options 402. When the import 403 is selected, an import data selection screen 411 illustrated in FIG. 4B is displayed. On the other hand, when the export 404 is selected, a setting value currently set in the image forming apparatus 101 is exported. A method for exporting the setting value will be described below. When the import 403 from the USB memory 230 is selected in the options 402 illustrated in FIG. 4A, the import data selection screen 411 illustrated in FIG. 4B is displayed. A data list on which import processing (an import data list 412) can be performed is displayed on the import data selection screen 411 through the USB memory 230. When the user selects import data 413 from the import data list 412, and presses an import button 414, the import instruction receiving unit 301 receives the import instruction from the user.

The import instruction receiving unit 301 determines an import data receiving path via which the import data has been received (hereinafter referred to as a receiving path), and stores information about the receiving path in the auxiliary storage device 204 or the volatile memory 203 within the image forming apparatus 101. Further, the import data receiving unit 301 presents the stored information about the receiving path in response to an acquisition request from a path effect determination unit 303. Details of the path effect determination unit 303 will be described below.

The import instruction, which has been received by the import instruction receiving unit 301, includes the import data 413 including the setting value for the image forming apparatus 101. The import instruction receiving unit 301 temporarily stores the received import data 413 in the volatile memory 203 or the auxiliary storage device 204 within the image forming apparatus 101. The import data 413 can be generated when the user issues an export instruction to an export instruction receiving unit 320. Moreover, the user can generate the import data 413 on the PC 102 and the management server 103.

An import data analysis unit 302 analyzes the import data 413 that has been stored in the volatile memory 203 or the auxiliary storage device 204 by the import instruction receiving unit 301. The analysis means identifying the setting value for the image forming apparatus 101 included in the import data 413. The import data 413 is analyzed so that information about the import data 413 can be handled with a program. The import data 413 is represented in an extensible markup language (XML) format similarly to import data 501 illustrated in FIG. 5, for example.

The path effect determination unit 303 (hereinafter referred to as the determination unit 303) determines whether the import data receiving path that has been determined by the import instruction receiving unit 301 is affected by importing the import data 413. Affect means that a result of importing the import data 413 cannot be output as an import result log (hereinafter referred to as a log) via the import data receiving path. The receiving path may be unusable by the import processing. Therefore, the determination unit 303 determines whether the receiving path is affected before the import processing.

Processing by the determination units 303 for determining whether the receiving path is affected by importing the import data 501 will be described with reference to FIGS. 6 and 8.

FIG. 6 illustrates an example of setting values retained by the auxiliary storage device 204 in the image forming apparatus 101. The setting value for the image forming apparatus 101 can be uniquely identified by a combination of an identifier 601, an identifier 602, and an identifier 603 illustrated in FIG. 6. A column of a description 604 illustrated in FIG. 6 includes character strings in which the meanings of the setting values for the image forming apparatus 101 are described in a natural language. A column of a value 605 illustrated in FIG. 6 includes setting values currently set in the image forming apparatus 101. For example, a value 606 indicates that a USB mass storage device is valid.

FIG. 8 illustrates a table of a receiving path or an output path via which a log is output and a prerequisite. The table is retained in the auxiliary storage device 204 or the volatile memory 203 within the image forming apparatus 101. A column of a path 801 includes a list of import data receiving paths or paths via which a log is output (output paths). The receiving paths include respective receiving paths from the USB memory 230, the NFC chip 210, the web browser, and the management server 103. The output paths include respective transmission paths to the USB memory 230, the NFC chip 210, the web browser, and the management server 103, or a report print and an electronic mail (e-mail) sending. The log means a record representing a result of importing the import data. The log includes information indicating when and which user has issued an instruction to perform import processing, information indicating whether import processing has been successful, and information such as a setting value for the image forming apparatus 101 after import processing. The path 801 can include the USB memory 230, the NFC chip 210, the web browser, and the management server 103 serving as the receiving paths or the output paths of the import data 413, and the report print and the e-mail sending that can be used only as the output paths. A column of a prerequisite 802 includes a list of conditions of setting values for an image forming apparatus 101 required to receive the import data 413 via the path 801 or to output the log. If the log is output through the USB memory 230, for example, a USB host interface and a USB mass storage device in the image forming apparatus 101 need to be enabled. If the log is output through the NFC chip 210, an NFC tag on the image forming apparatus 101 needs to be valid. If the log is output through the report print, the prerequisite 802 does not exist when it is referred to. Therefore, the printer device 205 can be used as the path at any time if usable (printable). If the log is output through the web browser, an internet protocol version 4 (IPv4) or an internet protocol version 6 (IPv6) needs to be valid. If the log is output through the management server 103, the IPv4 or IPv6 needs to be valid. If the log is output through an e-mail sending, a value valid for a simple mail transfer protocol (SMTP) server address needs to be set, and the IPv4 or the IPv6 needs to be valid. To use the path 801 requiring a plurality of prerequisites 802, all the prerequisites 802 need to be satisfied.

The determination unit 303 first requests the import instruction receiving unit 301 to acquire a receiving path, and acquires information about the receiving path. The prerequisite 802 for using the receiving path illustrated in FIG. 8 and the setting value included in the import data 413 are then compared with each other. If a content for changing a setting value serving as the prerequisite 801 is included in the import data 413 as a result of the comparison, the determination unit 303 determines that the receiving path is affected. If the content for changing the setting value serving as the prerequisite 802 is not included in the import data 413, the determination unit 303 determines that the receiving path is not affected.

Suppose the import data 501, which has been received through the USB memory 230, is imported to the image forming apparatus 101 in the state illustrated in FIG. 6, for example. When the import instruction receiving unit 301 first receives the import data 501 through the USB memory 230, the determination unit 303 acquires information indicating that the receiving path is the USB memory 230 from the import instruction receiving unit 301. Referring to FIG. 8, the prerequisite 803 corresponding to the USB memory 230 serving as the path 801 is then identified, and the prerequisite 803 and a setting value 502 included in the import data 501 are compared with each other. As a result of the comparison, setting of the USB mass storage device is changed when import processing is performed, and the log cannot be output through the USB memory 230. In such a case, the determination unit 303 determines that the receiving path is affected.

An alternative method selection unit 304 (hereinafter referred to as a selection unit 304) selects, out of the output paths, the output path different from the receiving path if the determination unit 303 determines that the receiving path is affected. The output path different from the receiving path means an output path via which a log can be output (hereinafter referred to as an alternative method) after import processing. The log can be output when the prerequisite 802 illustrated in FIG. 8 is satisfied. The selection unit 304 selects the alternative method based on the import data 413, which has been analyzed by the import data analysis unit 302, and the table illustrated in FIG. 8. Details of the log will be described below. Candidates for the alternative method include sending paths to the USB memory 230, the NFC chip 210, the web browser, and the management server 103, or the report print and the e-mail sending (see FIG. 8). If a setting value, which affects the plurality of paths 801, such as IPv4/IPv6, is changed by import processing, the selection unit 304 selects the USB memory 230, the NFC chip 210, or the report print as the alternative method.

Processing for selecting the alternative method will be described with reference to FIGS. 5, 6, and 8.

Consider a case where the import data 501 illustrated in FIG. 5 is imported to the image forming apparatus 101 in the state illustrated in FIG. 6, for example. After the import data 501 has been imported, a log cannot be output through the USB memory 230, as described above. However, the import data 501 does not include information for changing a setting value, which makes the other paths unusable. Therefore, the log can be output through the NFC chip 210, the report print, the web browser, the management server 103, and the e-mail sending. Therefore, the selection unit 304 selects the above-mentioned five paths as the alternative method.

A warning display unit 305 (hereinafter referred to as a display unit 305) displays a warning screen 421 on a display unit and warns the user if the determination unit 303 determines that the receiving path is affected. The display unit means the display 206 in the image forming apparatus 101, the web browser of the PC 102, and a display screen of the NFC chip 210. The display unit 305 displays the alternative method selected by the selection unit 304 on the warning screen 421, and controls the warning screen 421 so that the user can select the alternative method on the warning screen 421. A method for displaying a warning on the display differs depending on a receiving path of import data. If the import instruction receiving unit 301 receives an import instruction through the USB memory 230, for example, the display unit 305 displays a screen illustrated in FIG. 4C on the display 206. The warning screen 421 illustrated in FIG. 4C represents the entire warning screen. The display unit 305 displays the alternative method selected by the selection unit 304 in the options 422. The display unit 305 displays a detail button 423 and a reservation button 424 corresponding to each of the alternative methods. The display unit 305 displays, when it receives an instruction to select the detail button 423 from the user, a detail description corresponding to the detail button 423. The detail description includes a procedure for outputting a log via the alternative method selected by the user and a link to an operation screen for outputting a log. The detail description may be displayed on a screen other than the warning screen 421. The detail description may be displayed in the warning screen 421. An example of a screen relating to the detail description is not illustrated. The reservation button 424 is a button for reserving the alternative method before import processing if it is desirable to output a log via the alternative method displayed in the options 422. When an instruction to select the reservation button 424 corresponding to "acquisition of import result by NFC" from the user, an import result output unit 310, described below, outputs a log to the NFC compatible device 240 after the import processing ends. However, the display unit 305 does not display the reservation button 424 corresponding to "acquisition of import result by web browser" on the warning screen 421. If the log is output through the web browser, the display unit 305 displays, when it receives an instruction to select the detail button 423 from the user, a method for outputting a log, and a uniform resource locator (URL) or a hyperlink in the detail description. The user himself/herself accesses the displayed URL or hyperlink so that the log can be output through the web browser. The user presses the OK button 425 so that the import processing is performed, and the setting value included in the import data is reflected in the image forming apparatus 101. When the user presses a cancel button 426, the import processing ends without being performed.

An import processing unit 306 (hereinafter referred to as a processing unit 306) changes the setting value retained in the auxiliary storage device 204 in the image forming apparatus 101 using the import data that has been analyzed by the import data analysis unit 302. The changed setting value is stored in the auxiliary storage device 204 in the image forming apparatus 101.

An import result log output unit 310 (hereinafter referred to as an output unit 310) outputs a log representing a result of the import processing by the processing unit 306. After the import processing is performed, the output unit 310 outputs the log via the same path as the receiving path. However, if the determination unit 303 determines that the receiving path is affected and if the display unit 305 receives an instruction to select the reservation button 424 from the user, the output unit 310 outputs the log via a reserved path. If the selection unit 304 receives an instruction to select a plurality of alternative methods by the user, the output unit 310 outputs the log via the selected plurality of alternative methods. Outputting the log specifically means sending, when the alternative method selected on the warning screen 421 is the USB memory 230, a log to the USB memory 230 and recording the sent log as text data. If the alternative method is the NFC chip 210, a log is sent to the NFC compatible device 240 through the NFC chip 210, and is displayed on a display (not illustrated) in the NFC compatible device 240. Alternatively, a URL or a hyperlink is displayed on the display in the NFC compatible device 240 so that the user can download a log as text data from a link destination. If the alternative method is the report print, the printer device 205 prints a log. If the alternative method is the web browser, a log is retained in the image forming apparatus 101, and is sent to the web browser in response to an access from the web browser. Alternatively, a URL or a hyperlink is displayed on the web browser so that the user can download the log as text data from a link destination. If the alternative method is the management server 103, a log is retained in the image forming apparatus 101, and is sent to the management server 103 in response to an access from the management server 103. Alternatively, a URL or a hyperlink is displayed on the management server 103 so that the user can download the log from a link destination. If the alternative method is the e-mail sending, a log is described in a text of an e-mail and sent to the user, or is attached to the e-mail and sent to the user. The user can set a sending destination address of the e-mail in installing the image forming apparatus 101. When the user performs user authentication to import import data, an address of the user who has performed authentication can be made a sending destination. When the e-mail is selected as the alternative method on the warning screen 421, a sending destination of the log can be designated.

The log includes an import result success log 901 and an import result failure log 911. If the import processing has been successful, the output unit 310 outputs the import result success log 901 illustrated in FIG. 9A using a receiving path or an alternative method. If the import processing has been unsuccessful, the output unit 310 uses a receiving path, to output the import result failure log 911 illustrated in FIG. 9B.

The import result success log 901 will be described with reference to FIG. 9A. If the user imports the import data 501 through the USB memory 230, a path 902 becomes "Local (USB)". A result 903 indicates whether the import processing has been successful. If the import processing has been successful, the result 903 becomes "Success". A change log 909 represents respective setting values before and after the import processing. The change log 909 includes change logs for setting values relating to a setting 904 about a USB, a setting 905 about NFC, a setting 906 about network, and a setting 907 about an e-mail respectively. If the import processing has been successful, for example, the change log 909 records that a setting value representing validation/invalidation of a USB mass storage device is changed into "false", as represented by 908.

The import result failure log 911 will be described with reference to FIG. 9B. If the user imports the import data 501 through the USB memory 230, a path 912 becomes "Local (USB)". A result 913 indicates whether the import processing has been successful. If the import processing has been unsuccessful, the result 913 becomes "Failure". A change log 919 represents respective setting values before and after the import processing. The change log 919 includes change logs for setting values relating to a setting 914 about a USB, a setting 915 about NFC, a setting 916 about a network, and a setting 917 about an e-mail respectively. If the import processing has been unsuccessful, for example, a setting value is not changed, as represented by 918.

An export instruction receiving unit 320 receives an export instruction to export a setting value for the image forming apparatus 101 using various interface units included in the image forming apparatus 101.

An export processing unit 321 generates export data in response to the export instruction that has been received by the export instruction receiving unit 320. The generated export data is temporarily retained in the auxiliary storage device 204 or the volatile memory 203 within the image forming apparatus 101. The generated export data can also be output to an external apparatus such as the USB memory 230.

Import processing for import data will be described with reference to a flowchart illustrated in FIG. 7. The CPU 201 reads out a program stored in the nonvolatile memory 202 or the auxiliary storage device 204, to execute the following steps.

In step S701, the import instruction receiving unit 301 receives an import instruction from a user. When the import instruction receiving unit 301 receives the import instruction, the import instruction receiving unit 301 stores information about a receiving path and import data in the auxiliary storage device 204 or the volatile memory 203 within the image forming apparatus 101.

In step S702, the analysis unit 302 analyzes the import data that has been stored in step S701.

In step S703, the determination unit 303 determines whether the receiving path is affected by performing import processing on the import data that has been received in step S701. The determination unit 303 performs the determination based on the information about the receiving path, which has been stored in step S701, and the prerequisite 802 illustrated in FIG. 8. As a result of the determination, if it is determined that the receiving path is not affected (NO in step S703), the processing proceeds to step S704. If it is determined that the receiving path is affected (YES in step S703), the processing proceeds to step S706.

In step S704, the processing unit 306 performs import processing on the import data that has been received in step S701. More specifically, a setting value for the image forming apparatus 101 included in the import data, which has been received in step S701, is reflected in the image forming apparatus 101.

In step S705, the CPU 201 causes the output unit 310 to output a log via the receiving path, and the import processing ends.

In step S706, the selection unit 304 selects alternative methods via which the log can be output in place of the receiving path, which has been determined to be affected based on a result of the analysis in step S702.

In step S707, the display unit 305 displays the warning screen 421 illustrated in FIG. 4C, and receives an instruction to select a button from the user. In the options 422 in the warning screen 421, a list of the alternative methods via which the log can be output after the import, which have been selected in step S706, is displayed.

In step S708, the CPU 201 determines whether the display unit 305 has received an instruction to select the OK button 425 by the user on the warning screen 421 that has been displayed in step S707. If it is determined that the display unit 305 has received the instruction to select the OK button 425 (YES in step S708), the processing proceeds to step S709. If it is determined that the display unit 305 has not received the instruction to select the OK button 425 (NO in step S708), the processing proceeds to step S712.

In step S709, the import processing unit 306 performs import processing on the import data, like in step S704.

In step S710, the CPU 201 determines whether the display unit 305 has received an instruction to select the reservation button 424 by the user on the warning screen 421 that has been displayed in step S707. If it is determined that the display unit 305 has received the instruction to select the reservation button 424 (YES in step S710), the processing proceeds to step S711. If it is determined that the display unit 305 has not received the instruction to select the reservation button 424 (NO in step S710), the import processing ends.

In step S711, the output unit 310 outputs a log via the alternative method corresponding to the reservation button 424, which has received the selection instruction from the user in step S710, and the import processing ends.

In step S712, the CPU 201 determines whether the display unit 305 has received an instruction to select the detail button 423 from the user on the warning screen 421 that has been displayed in step S707. If it is determined that the display unit 305 has received the instruction to select the detail button 423 (YES in step S712), the processing proceeds to step S713. If it is determined that the display unit 305 has not received the instruction to select the detail button 423 (NO in step S710), the processing proceeds to step S714.

In step S713, the display unit 305 displays a detail description (not illustrated) of the alternative method corresponding to the detail button 423, which has received the selection instruction from the user in step S712. After the display unit 305 has displayed the detail description, the processing proceeds to step S708 again.

In step S714, the CPU 201 determines whether the display unit 305 has received an instruction to select the cancel button 426 by the user on the warning screen 421 that has been displayed in step S707. If it is determined that the display unit 305 has received the instruction to select the cancel button 426 (YES in step S714), the import processing ends. If it is determined that the display unit 305 has not received the instruction to select the cancel button 426 (NO in step S710), the processing proceeds to step S708.

The import processing for the import data according to a first exemplary embodiment has been described.

In the first exemplary embodiment, after receiving the import instruction, the import processing is regarded as being performed until output of the log has been completed and acceptance of further import instruction and change in the setting value for the image forming apparatus 101 by another unit is inhibited.

A second exemplary embodiment will be described below.

While the setting value for the image forming apparatus 101 is stored in the auxiliary storage device 204 in the first exemplary embodiment, another storage medium may be used. For example, a setting value may be stored in the nonvolatile memory 202. Further, a setting value may be stored in a location that can be referred to from the image forming apparatus 101.

While the import instruction receiving unit 301 can receive the import instruction via the four paths in the first exemplary embodiment, another configuration may be used. For example, the import instruction receiving unit 301 may issue an import instruction only via one path. Alternatively, the import instruction receiving unit 301 may receive an import instruction via more paths than those illustrated in the first exemplary embodiment.

While the import instruction receiving unit 301 receives the import data and the import instruction to perform import processing in the first exemplary embodiment, another configuration may be used. For example, an import instruction, together with information other than the import instruction, may be received. An import instruction to be received may be divided into a plurality of parts.

While the import instruction receiving unit 301 has a function of determining the receiving path in the first exemplary embodiment, paths other than the receiving path may be determined. If an import instruction is received via a network, for example, a network address of an information device serving as an instruction source may be identified. In this case, the determination unit 303 may determine the effect on a receiving path based on the network address. More specifically, if there exists a setting for inhibiting network communication with a specific network address, the determination unit 303 can determine its effect.

While the analysis unit 302 analyzes the entire import data in the first exemplary embodiment, another configuration may be used. For example, the analysis unit 302 may previously analyze only a setting value relating to a determination of a receiving path. High-speed analysis can be performed by acquiring a setting value relating to the receiving path from the prerequisite illustrated in FIG. 8 and extracting only corresponding information from import data. In this configuration, remaining import data can also be analyzed while the selection instruction issued by the user is being waited for in step S707 in the first exemplary embodiment, so that actual import processing is not delayed.

While the determination unit 303 determines validation/invalidation of IPv4 and IPv6 based on the table illustrated in FIG. 8 in the first exemplary embodiment, another configuration may be used. For example, the CPU 201 may determine whether a receiving path is affected based on a network address, as described above. In this case, if an import instruction including a change in the network address has been issued, a character string or a hyperlink representing a URL after the change of the address may be displayed on the warning screen 421. In this case, if an import instruction through a network access from inside the image forming apparatus 101 has been issued, an additional determination that a receiving path is not affected by the change in the network address, may be made.

While the selection unit 304 selects the alternative method when the determination unit 303 determines that the receiving path is affected, a further determination may be performed. The selection unit 304 may determine whether the printer device 205 is usable when it selects a report print function as an alternative method, for example. If the printer device 205 is unusable while a large number of jobs are being printed or when an abnormality occurs by newly adding a criterion for the report print function, the report print function cannot be selected as the alternative method. If the selection unit 304 determines that the printer device 205 cannot be used due to a temporary error such as a paper jam, a configuration in which the display unit 305 displays a screen for warning an error and a navigation screen for removing jammed paper may be added. The selection unit 304 may determine whether a license is required to use the alternative method or there is hardware required to use the alternative method. Further, if there is hardware required to use the alternative method, the selection unit 304 may determine a connection state with the hardware.

While the display unit 305 presents the warning screen 421 to the user using any user interface, another configuration may be used. If the image forming apparatus 101 does not include the display 206 capable of displaying information as illustrated in FIG. 4C, an alternative method via which a log can be output may be selected as a report print. Only a navigation such as an operation procedure may be displayed on the display 206 through a web browser. The user may be guided to a button for selecting the USB host interface 209, an NFC chip 210, or a report print using a light emitting diode (LED).

While the output unit 310 includes the output path via which the log is output, as illustrated in FIG. 8, in the first exemplary embodiment, another configuration may be used. For example, a log may be output to a common folder. A log may be output in hypertext transfer protocol (HTTP) communication to a specific server.

While the log is output using the receiving path or the path which has been reserved on the warning screen 421, another configuration may be used. For example, suppose a configuration in which a user designates a path via which a log is output in issuing an import instruction. In this configuration, the import instruction receiving unit 301 receives an instruction to use an output path via which the log is output together with the import instruction, and stores information about the receiving path and the output path in the auxiliary storage device 204 or the volatile memory 203 within the image forming apparatus 101. The determination unit 303 acquires information about the receiving path and the output path from the import instruction receiving unit 301, and determines whether the output path, which has been designated by the user, is affected by the import processing.

According to the first exemplary embodiment, until output of the log has been completed, the import processing is regarded as being carried out, and the further receiving of the import instruction and change in the setting value for the image forming apparatus 101 by another unit are inhibited. However, another configuration may be used. For example, only change of a setting value about a path via which a log is output may be inhibited Similarly, only when a report print is selected, input of a job including printing may be inhibited.

While the alternative method is selected when it is determined that the receiving path is affected by the import processing in the first exemplary embodiment, another configuration may be used. For example, suppose a case where import data, which makes the USB host interface 209 invalid, is transferred in response to an import instruction through the USB memory 230. Processing for disabling the USB host interface 209 is scheduled to be carried out at the end of the import processing, and a log, which is expected to be successful, is stored in the USB memory 230. If the processing for invalidating the USB host interface 209 has been unsuccessful, the USB memory 230 can be accessed. Therefore, an import result of the USB memory 230 is corrected to an import result failure log 911. If the processing for invalidating the USB host interface 209 has been successful, a log, which is already stored in the USB memory 230 and expected to be successful, is processed as an import result success log 901, and the processing ends as is.

While the setting value is immediately reflected when the import processing is performed in the first exemplary embodiment, another configuration may be used. For example, the USB host interface 209 may be enabled after restart. In this case, a log is output after the restart.

The above described embodiments are also applicable to an information processing apparatus other than the image forming apparatus.

Other Embodiments

Additional embodiments can also be realized by a computer of a system or apparatus that reads out and executes computer executable instructions recorded on a storage medium (e.g., computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-161545 filed Jul. 20, 2012, which is hereby incorporated by reference herein in its entirety.

What is claimed is:

1. An image forming apparatus having a function of importing import data including a setting value for the image forming apparatus, the image forming apparatus comprising:
   a memory; and
      a processing unit in communication with the memory, the processing unit configured to control:
      a receiving unit configured to receive an import instruction to receive, via any one of a plurality of paths, the import data including the setting value for the image forming apparatus and perform import processing on the import data;
   an analysis unit configured to analyze the import data based on the import instruction;
   a determination unit configured to determine, based on an import data receiving path via which the import data has been received and the import data that has been analyzed by the analysis unit, whether the import data receiving path is affected by performing import processing on the import data;
   an output unit configured to output, when the determination unit determines that the import data receiving path is not affected, an import result log representing a result of importing the import data via the import data receiving path after the import data has been imported and, when the determination unit determines that the import data receiving path is affected, the output unit outputs the import result log via an output path different from the import data receiving path; and
   a display unit configured to display, when the determination unit determines that the import data receiving path is affected and prior to performing import processing on the import data, a screen displaying a warning that the import data receiving path is affected.

2. The image forming apparatus according to claim 1, wherein the display unit controls, when the determination unit determines that the import data receiving path is affected, displaying the screen so that the output path different from the import data receiving path can be selected on the screen.

3. The image forming apparatus according to claim 2, wherein the display unit selects, when the determination unit determines that the import data receiving path is affected, an output path via which the import result log can be output in place of the import data receiving path, and controls displaying the screen so that the selected output path can be selected on the screen.

4. The image forming apparatus according to claim 1, wherein the output unit outputs, when the receiving unit receives the import instruction and a designation of the output path via which the import result log is output, the import result log via the output path that has been designated by the receiving unit.

5. The image forming apparatus according to claim 1, wherein the output path includes at least one of transmission paths to a USB memory, an NFC chip, a web browser, a management server, or a report print and an e-mail sending.

6. The image forming apparatus according to claim 1, wherein the import data receiving path includes at least one of receiving paths from a USB memory, an NFC chip, a web browser, or a management server.

7. A method for controlling an image forming apparatus having a function of importing import data including a setting value for the image forming apparatus, the method comprising:

receiving an import instruction to receive the import data including a setting value for the image forming apparatus via one of a plurality of paths;

performing import processing on the import data;

analyzing the import data based on the import instruction;

determining, based on an import data receiving path via which the import data has been received and the analyzed import data, whether the import data receiving path is affected by performing import processing on the import data;

outputting, when it is determined that the import data receiving path is not affected, an import result log representing a result of importing the import data via the import data receiving path after the import data has been imported, outputting, when it is determined that the import data receiving path is affected, the import result log via an output path different from the import data receiving path; and displaying, when it is determined that the import data receiving path is affected and prior to performing import processing on the import data, a screen displaying a warning that the import data receiving path is affected.

8. The method according to claim 7, wherein the display of the screen is controlled when it is determined that the import data receiving path is affected so that the output path different from the import data receiving path can be selected on the screen.

9. The method according to claim 8, wherein an output path via which the import result log can be output in place of the import data receiving path is selected when it is determined that the import data receiving path is affected, and the display of the screen is controlled so that the selected output path can be selected on the screen.

10. The method according to claim 7, wherein the import result log is output, via the designated output path, when the import instruction and a designation of the output path via which the import result log is output are received.

11. The method according to claim 7, wherein the output path includes at least one of transmission paths to a USB memory, an NFC chip, a web browser, a management server, or a report print and an e-mail sending.

12. The method according to claim 7, wherein the import data receiving path includes at least one of receiving paths from a USB memory, an NFC chip, a web browser, or a management server.

13. A non-transitory computer-readable storage medium storing a program for causing a computer to perform the control method according to claim 7.

* * * * *